(12) United States Patent
Bang et al.

(10) Patent No.: US 10,743,348 B2
(45) Date of Patent: Aug. 11, 2020

(54) METHOD FOR MULTI-USER TRANSMISSION IN WIRELESS LAN SYSTEM AND WIRELESS TERMINAL USING SAME

(71) Applicant: LG ELECTRONICS INC., Seoul (KR)

(72) Inventors: Saehee Bang, Seoul (KR); Kiseon Ryu, Seoul (KR); Jeongki Kim, Seoul (KR); Hangyu Cho, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 16/094,168

(22) PCT Filed: Apr. 17, 2017

(86) PCT No.: PCT/KR2017/004102
§ 371 (c)(1),
(2) Date: Oct. 16, 2018

(87) PCT Pub. No.: WO2017/183869
PCT Pub. Date: Oct. 26, 2017

(65) Prior Publication Data
US 2019/0141747 A1   May 9, 2019

Related U.S. Application Data

(60) Provisional application No. 62/323,773, filed on Apr. 17, 2016, provisional application No. 62/330,870, filed on May 3, 2016.

(51) Int. Cl.
*H04W 4/00* (2018.01)
*H04W 74/08* (2009.01)
(Continued)

(52) U.S. Cl.
CPC ...... *H04W 74/0816* (2013.01); *H04B 7/0404* (2013.01); *H04W 72/0446* (2013.01);
(Continued)

(58) Field of Classification Search
CPC .. H04W 72/042; H04W 76/27; H04L 5/0053; H04L 5/0007; H04L 5/0048
See application file for complete search history.

(56) References Cited

U.S. PATENT DOCUMENTS 10,172,137 B1 * 1/2019 Hedayat ................ H04W 74/02
2005/0128977 A1 * 6/2005 Kwak .................... H04W 28/14
370/329

(Continued)

FOREIGN PATENT DOCUMENTS

EP          2757850       7/2014
KR     1020140122429    10/2014
(Continued)

OTHER PUBLICATIONS

PCT International Application No. PCT/KR2017/004102, International Search Report dated Jul. 20, 2017, 4 pages.
(Continued)

*Primary Examiner* — Atique Ahmed
(74) *Attorney, Agent, or Firm* — Lee, Hong, Degerman, Kang & Waimey

(57) ABSTRACT

A method for multi-user transmission in a wireless LAN system according to one embodiment of the present specification comprises the steps of: individually performing, by a STA including a first directional antenna and a second directional antenna, a first countdown procedure for the first directional antenna and a second countdown procedure for the second directional antenna according to a directional CCA operation for the first and second directional antennas; determining the first directional antenna as a primary
(Continued)

antenna when the first countdown procedure is completed before the second countdown procedure; determining whether the second directional antenna is idle from a threshold time before a completion time point of the first countdown procedure to the completion time point; and transmitting multiple streams on the basis of the first and second directional antennas according to the result of the determination.

10 Claims, 11 Drawing Sheets

(51) Int. Cl.
| | |
|---|---|
| *H04B 7/0404* | (2017.01) |
| *H04W 84/12* | (2009.01) |
| *H04W 72/04* | (2009.01) |
| *H04W 80/02* | (2009.01) |
| *H04W 80/08* | (2009.01) |

(52) U.S. Cl.
CPC ....... *H04W 74/0808* (2013.01); *H04W 84/12* (2013.01); *H04W 80/02* (2013.01); *H04W 80/08* (2013.01)

(56) References Cited

U.S. PATENT DOCUMENTS

| | | | |
|---|---|---|---|
| 2005/0141548 A1* | 6/2005 | Koo | H04W 72/1242 370/462 |
| 2006/0274776 A1* | 12/2006 | Malik | H04B 7/00 370/445 |
| 2011/0116401 A1* | 5/2011 | Banerjea | H04W 74/08 370/252 |
| 2016/0037560 A1* | 2/2016 | Liu | H04W 74/0808 370/329 |
| 2017/0034838 A1* | 2/2017 | Trainin | H04W 74/0808 |
| 2017/0118774 A1* | 4/2017 | Cariou | H04W 74/0816 |
| 2017/0289987 A1* | 10/2017 | Seok | H04W 84/12 |

FOREIGN PATENT DOCUMENTS

| | | |
|---|---|---|
| WO | 2014022753 | 2/2014 |
| WO | 2015142388 | 9/2015 |

OTHER PUBLICATIONS

Zhang, "DTRA: directional transmission and reception algorithms in WLANs with directional antennas for QoS support", IEEE Network, vol. 19, Issue:3, May-Jun. 2005, 8 pages.

* cited by examiner

FIG. 1
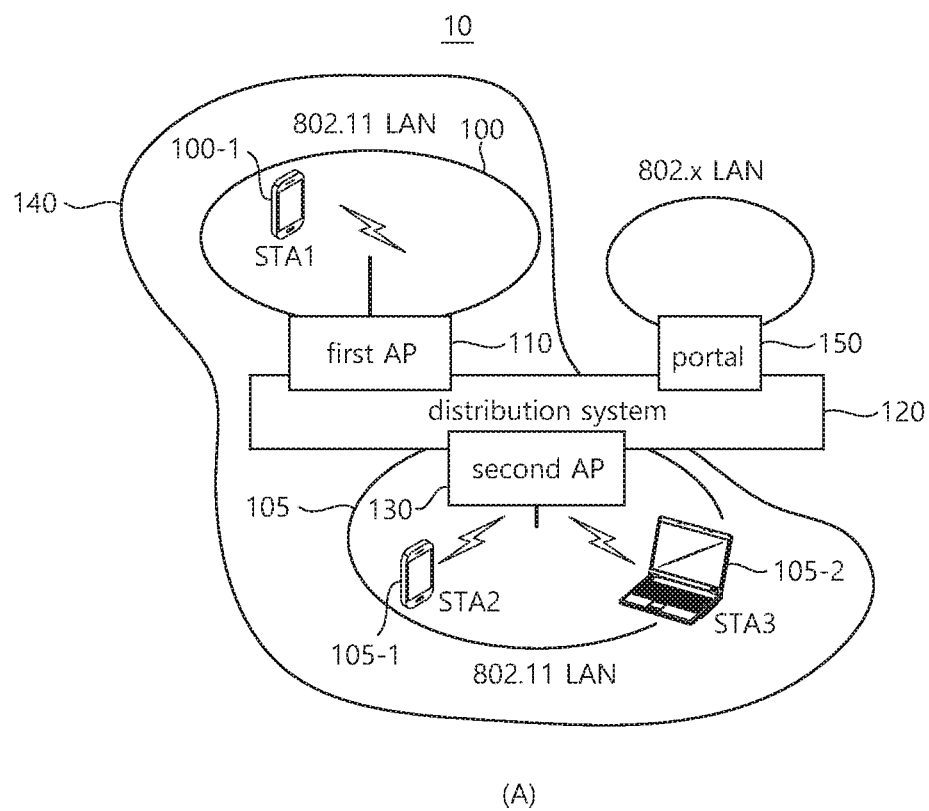
(A)
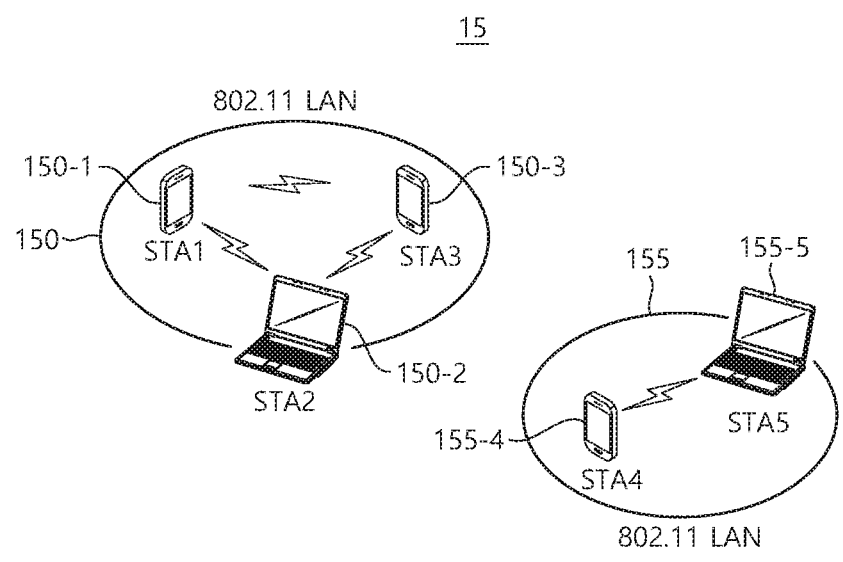
(B)

METHOD FOR MULTI-USER TRANSMISSION IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2017/004102, filed on Apr. 17, 2017, which claims the benefit of U.S. Provisional Applications No. 62/323,773, filed on Apr. 17, 2016 and 62/330,870, filed on May 3, 2016, the contents of which are all hereby incorporated by reference herein in their entirety.

BACKGROUND OF THE INVENTION

Field of the Invention

The present invention relates to wireless communication and, more particularly, to a method for multi-user transmission in a wireless LAN system and a wireless terminal using the same.

Related Art

Institute of Electrical and Electronics Engineers (IEEE) 802.11ad standard is ultra-high speed wireless communication standard operating in a band higher than 60 GHz. The coverage of a signal is about 10 meters, and meanwhile, throughput of more than 6 GHz is supportable. Since it operates high frequency band, signal propagation is dominated by ray-like propagation. As a transmitted (TX) or received (RX) antenna beam is aligned toward a strong spatial signal path, a signal quality can be improved.

IEEE 802.11ad standard provides beamforming training procedure for antenna beam alignment. IEEE 802.11ay is next generation standard which is being developed in a target of throughput of 20 Gbps or more based on IEEE 802.11ad standard.

SUMMARY OF THE INVENTION

An object of the present disclosure is to provide a method for multi-user transmission in a wireless LAN system having improved performance and a wireless terminal using the same.

The present relates to a method for multi-user transmission in a wireless LAN system. A method for multi-user transmission in a wireless LAN system according to an embodiment includes performing, by a station (STA) including a first directional antenna and a second directional antenna, a first countdown procedure for the first directional antenna and a second countdown procedure for the second directional antenna individually according to a directional Clear Channel Assessment (CCA) process for the first directional antenna and the second directional antenna, determining the first directional antenna to be a primary antenna, when the first countdown procedure is completed before the second countdown procedure, determining whether the second directional antenna is idle from a threshold time to a completion time based on the completion time of the first countdown procedure and transmitting a plurality of streams based on the first directional antenna and the second directional antenna according to the determination.

According to an embodiment of the present disclosure, it is provided a method for multi-user transmission in a wireless LAN system having improved performance and a wireless terminal using the same.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
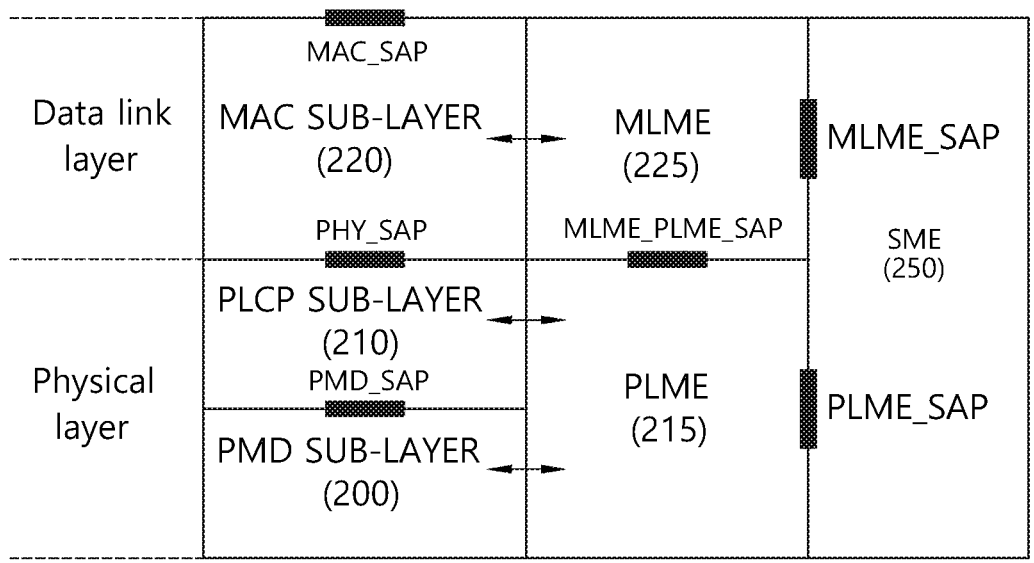
FIG. 2 is a conceptual view illustrating a layered architecture of a WLAN system supported by IEEE 802.11.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network. FIG. 1A illustrates the structure of an infrastructure basic service set (BSS) of institute of electrical and electronic engineers (IEEE) 802.11.

Referring the FIG. 1A, the WLAN system 10 of the FIG. 1A may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be related with one AP 110. The BSS 105 may include one or more STAs 105-1 and 105-2 which may be related with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1A, a network between the APs 110 and 130 and a network between the APs 110 and 130 and the STAs 100-1, 105-1, and 105-2 may be implemented.

FIG. 1B illustrates a conceptual view illustrating the IBSS. Referring to FIG. 1B, a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1B, the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner.

In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a conceptual view illustrating a layered architecture of a WLAN system supported by IEEE 802.11. Referring to FIG. 2, the layered architecture of the WLAN system may include a physical medium dependent (PMD) sub-layer 200, a physical layer convergence procedure (PLCP) sub-layer 210, and a medium access control (MAC) sub-layer 220.

The PLCP sub-layer 200 may serve as a transmission interface for transmitting/receiving data between a plurality of STAs. The PLCP sub-layer 210 is implemented such that the MAC sub-layer 220 is operated with a minimum dependency with respect to the PMD sub-layer 200.

The PMD sub-layer 200, the PLCP sub-layer 210, and the MAC sub-layer 220 may conceptually include respective management entities. For example, the management entity of the MAC sub-layer 220 is referred to as a MAC layer management entity (MLME) 225. The management entity of the physical layer is referred to as a PHY layer management entity (PLME) 215.

The management entities may provide an interface for performing a layer management operation. For example, the PLME 215 may be connected to the MLME 225 to perform a management operation of the PLCP sub-layer 210 and the PMD sub-layer 200. The MLME 225 may be connected to the PLME 215 to perform a management operation of the MAC sub-layer 220.

An STA management entity (SME) 250 may exist to perform a proper MAC layer operation. The SME 250 may be operated as a constitutional element independent of each layer. The PLME 215, the MLME 225, and the SME 250 may mutually transmit and receive information on the basis of a primitive.

The operation of each sub-layer is briefly described as follows. For example, the PLCP sub-layer 210 delivers a MAC protocol data unit (MPDU) received from the MAC sub-layer 220 according to an instruction of the MAC layer between the MAC sub-layer 220 and the PMD sub-layer 200 to the PMD sub-layer 200 or delivers a frame from the PMD sub-layer 200 to the MAC sub-layer 220.

The PMD sub-layer 200 is a PLCP sub-layer and may transmit and receive data between a plurality of STAs through a wireless medium. The MPDU delivered from the MAC sub-layer 220 is referred to as a physical service data unit (PSDU) in the PLCP sub-layer 210. Although the MPDU is similar to the PSDU, if an aggregated MPDU (AMPDU) obtained by aggregating a plurality of MPDUs is delivered, the MPDUs may be individually different from the PSDUs.

The PLCP sub-layer 210 adds an additional field including information required by a transceiver of a physical layer in a process of receiving the PSDU from the MAC sub-layer 220 and delivering it to the PMD sub-layer 200. In this case, the field added to the PSDU may be a PLCP preamble, a PLCP header, and tail bits required to return a convolution encoder to a zero state.

The PLCP sub-layer 210 adds the aforementioned fields to the PSDU to generate a PLCP protocol data unit (PPDU) and transmits the PPDU to a receiving station through the PMD sub-layer 200. The receiving station receives the PPDU to perform restoration by obtaining information required to restore data from the PLCP preamble and the PLCP header.

Figure 3:
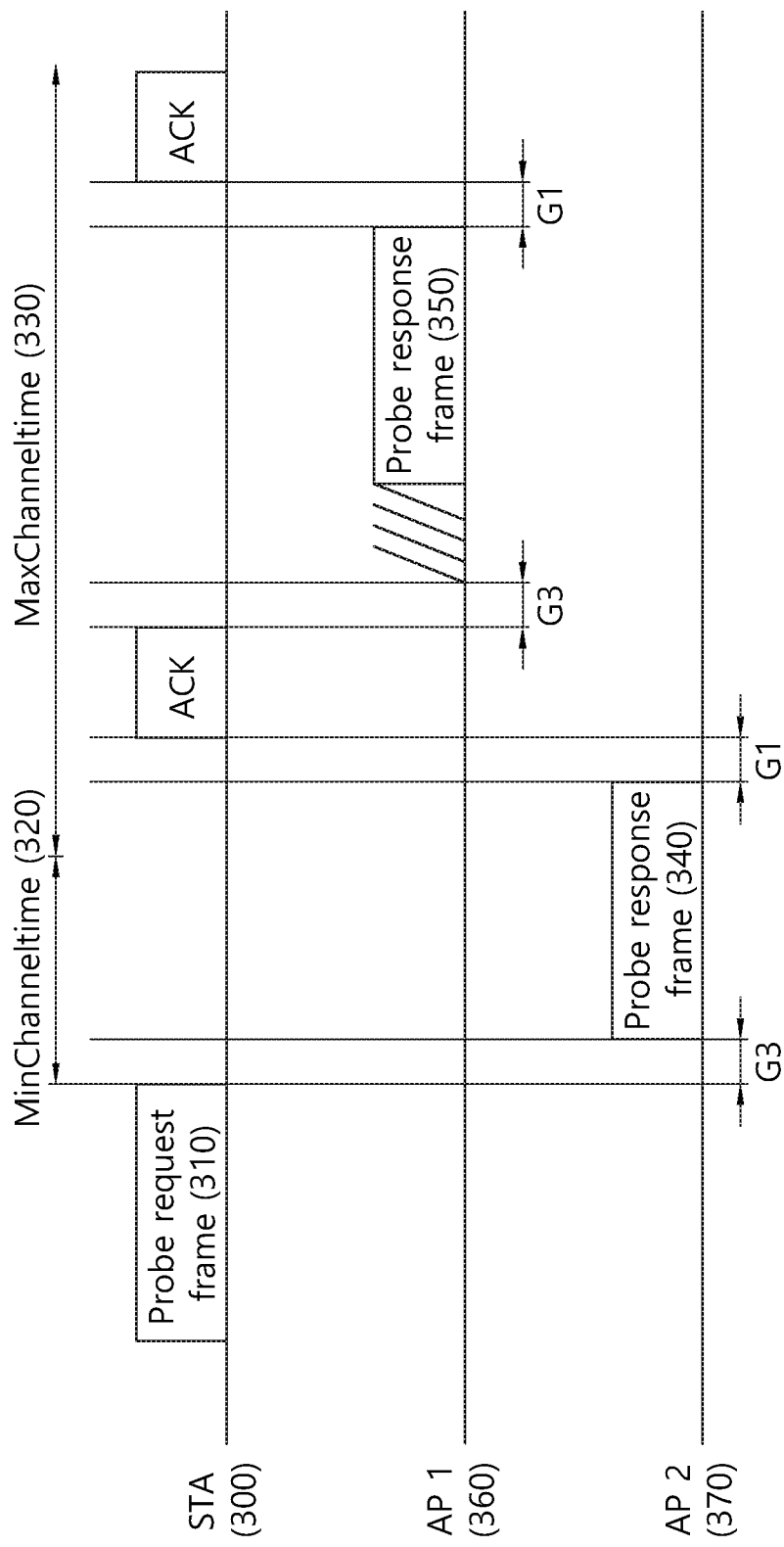
FIG. 3 is a concept view illustrating an active scanning procedure.

FIG. 3 is a concept view illustrating an active scanning procedure.

Referring to FIG. 3, the active scanning procedure may be performed in the following steps.

(1) It is determined whether the STA 300 is ready to perform the scanning procedure.

The STA 300 may wait, e.g., until the probe delay time expires or particular signaling information (for example, PHY-RXSTART.indication primitive) is received to perform active scanning.

The probe delay time is a delay that occurs before the STA 300 sends a probe request frame 310 when performing active scanning. PHY-RXSTART.indication primitive is a signal that is transmitted from the physical (PHY) layer to the local medium access control (MAC) layer. PHY-RXSTART.indication primitive may signal information indicating that the physical layer convergence protocol (PLCP) has received a PLCP protocol data unit (PPDU) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 300 may transmit the probe request frame 310 to the APs 360 and 370 using a basic access method.

(3) Information for specifying the APs 360 and 370 included in MLME-SCAN.request primitive (for example, service set identification (SSID) and basic service set identification (BSSID) information) may be included in the probe request frame 310 and may be transmitted.

The BSSID may have a value corresponding to the MAC address of the AP as an indicator to specify the AP. The service set identification (SSID) is a network term for specifying an AP, which may be read by a person who operates the STA. The BSSID and/or SSID may be used to specify an AP.

The STA 300 may specify an AP based on the information to specify the APs 360 and 370 included by MLME-SCAN.request primitive. The specified APs 360 and 370 may send the probe response frames 350 and 350 to the STA 300. The STA 300 may include the SSID and BSSID information in the probe request frame 310 and send the same, thereby unicasting, multicasting, or broadcasting the probe request frame 310. A method of unicasting, multicasting, or broadcasting the probe request frame 310 using the SSID and BSSID information is further described with reference to FIG. 5.

For example, in case an SSID list is included in MLME-SCAN.request primitive, the STA 300 may include the SSID list in the probe request frame 310 and transmit the same. The APs 360 and 370 may receive the probe request frame 310, determine the SSIDs included in the SSID list contained in the received probe request frame 310, and determine whether to send the probe response frames 350 and 350 to the STA 300.

(4) A probe timer is initialized as 0 and is then operated.

The probe timer may be used to check a minimum channel time (MinChanneltime) 320 and a maximum channel time (MaxChanneltime) 530. The minimum channel time 320 and the maximum channel time 530 may be used to control the active scanning operation of the STA 300.

The minimum channel time 320 may be used to perform the operation for varying the channel for conducting active scanning. For example, in case the STA 300 fails to receive the probe response frames 350 and 350 until the probe timer reaches the minimum channel time 320, the STA 300 shifts scanning channels to perform scanning on other channels. In case the STA 300 receives the probe response frame 350 until the probe timer reaches the minimum channel time 320, it may process the received probe response frames 340 and 350 after waiting until the probe timer reaches the maximum channel time 530.

The STA 300 may detect PHY-CCA.indication primitive until the probe timer reaches the minimum channel time 320 and may determine whether other frame (for example, probe response frames 340 and 350) has been received by the STA 300 until before the minimum channel time 320.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 300 may determine that there are probe response frames 340 and 350 received by the STA 300 when PHY-CCA.indication is detected to be busy and may determine that there are no probe response frames 340 and 350 received by the STA 300 when PHY-CCA.indication is detected to be idle.

In case PHY-CCA.indication is detected to be idle, the STA 300 may set a net allocation vector (NAV) to 0, and the STA 300 may scan a next channel. In case PHY-CCA.indication is detected to be busy, the STA 300 may perform a process on the received probe response frames 340 and 350 after the probe timer reaches the maximum channel time 530. After the process on the received probe response frames 340 and 350 is done, the STA 300 may set the net allocation vector (NAV) to 0 and may then scan a next channel.

Hereinafter, in embodiments of the present invention, determining whether there are probe response frames 340 and 350 received by the STA 300 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 300 uses the active scanning method, the STA 300 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is another BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo.

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 4:
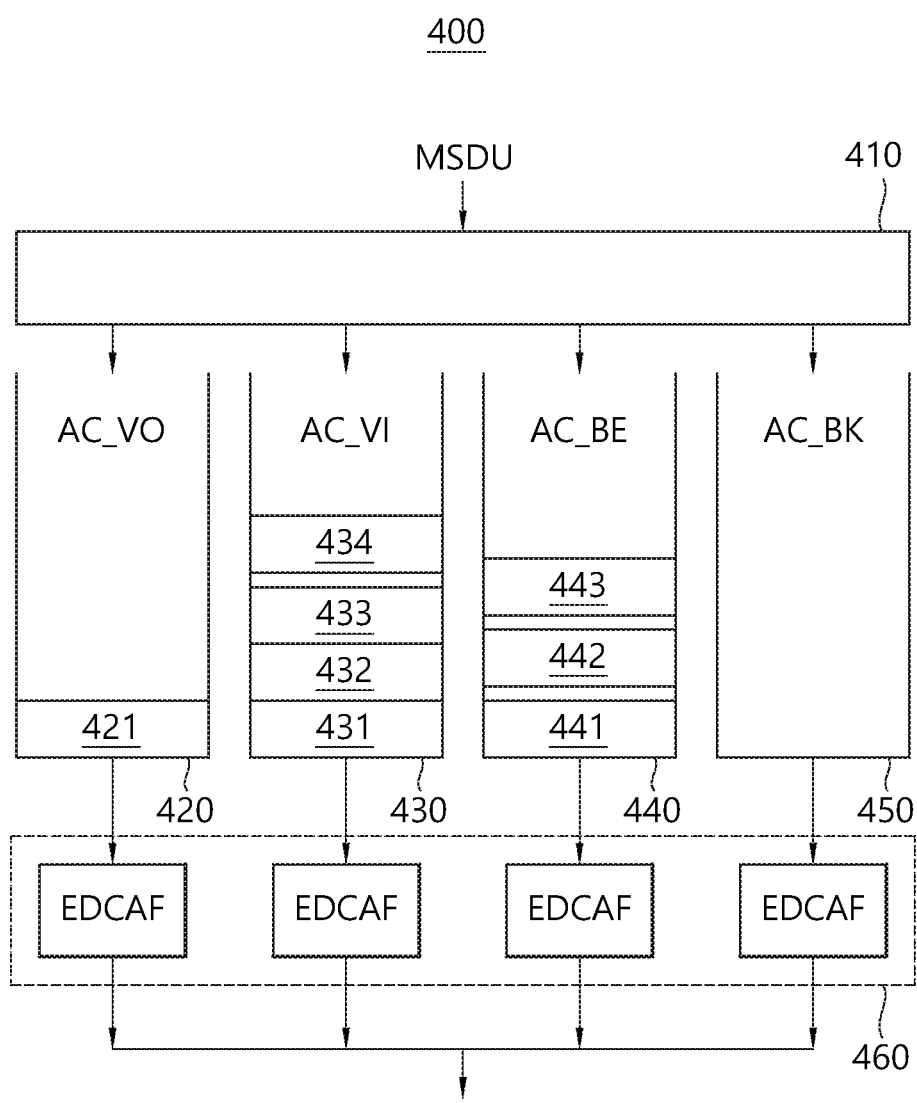
FIG. 4 illustrates a conceptual diagram of an STA performing an EDCA-based channel access in a WLAN system according to an exemplary embodiment of this specification.

FIG. 4 illustrates a conceptual diagram of an STA performing an EDCA-based channel access in a WLAN system according to an exemplary embodiment of this specification. In the WLAN system, an STA (or AP) performing enhanced distributed channel access (EDCA) may perform channel access according to a plurality of user priority levels that are predefined for the traffic data.

The EDCA for the transmission of a Quality of Service (QoS) data frame based on the plurality of user priority levels may be defined as four access categories (hereinafter referred to as 'AC's) (background (AC_BK), best effort (AC_BE), video (AC_VI), and voice (AC_VO)).

An STA performing channel access based on the EDCA may map the traffic data, i.e., MAC service data unit (MSDU), departing from a logical link control (LLC) layer and reaching (or arriving at) a medium access control (MAC) layer, as shown below in Table 1. Table 1 is an exemplary table indicating the mapping between user priority levels and ACs.

TABLE 1

| Priority | User priority | Access category (AC) |
| --- | --- | --- |
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In the present embodiment, a transmission queue and a channel access parameter set may be defined for each AC. The plurality of user priorities may be implemented based on the channel access parameter set which is set differently for each AC.

When performing a backoff procedure for transmitting a frame belonging to each AC, the STA performing channel access based on the EDCA may use each of an arbitration interframe space (AIFS)[AC], a CWmin[AC], and a CWmax[AC] instead of a DCF interframe space (DIFS), a CWmin, and a CWmax, which correspond to parameters for a backoff procedure that is based on a distributed coordination function (DCF).

For reference, the default values of the parameters corresponding to each AC are shown in Table 2 below as an example.

TABLE 2

| AC | CWmin[AC] | CWmax[AC] | AIFS[AC] | TXOP limit[AC] |
| --- | --- | --- | --- | --- |
| AC_BK | 31 | 1023 | 7 | 0 |
| AC_BE | 31 | 1023 | 3 | 0 |

TABLE 2-continued

| AC | CWmin[AC] | CWmax[AC] | AIFS[AC] | TXOP limit[AC] |
| --- | --- | --- | --- | --- |
| AC_VI | 15 | 31 | 2 | 3.008 ms |
| AC_VO | 7 | 15 | 2 | 1.504 ms |

The EDCA parameters used in the backoff procedure for each AC may be set as default value or forwarded to each STA with being carried on a beacon frame from an AP to each STA. As AIFS [AC] and CWmin [AC] values decrease, a higher priority is given, and accordingly, the channel access delay shortens, thus allowing for use of more bands in a given traffic environment.

The EDCA parameter set element may include information on channel access parameters for each AC (e.g., AIFS [AC], CWmin[AC], CWmax[AC]).

In the case that a collision occurs between the STAs while the STA transmits a frame, an EDCA backoff procedure of generating a new backoff counter is similar to the existing DCF backoff procedure.

The differentiated backoff procedures for each AC may be performed based on different EDCA parameters. The EDCA parameters may become an important means used to differentiate channel access of various user priorities of traffic.

A proper configuration of the EDCA parameter value defined for each AC may increase the transport effect according to the priority of traffic while optimizing a network performance. Accordingly, an AP may perform the overall management and adjustment function for the EDCA parameters to ensure media accesses to all STAs that participate in the network.

In this disclosure, a user priority predefined for traffic data (or traffic) may be referred to as a traffic identifier (hereinafter, 'TID').

A transmission priority of traffic data may be determined based on the user priority. Referring to Table 1, the TID of the traffic data of which user priority is the highest may be set to '7'. That is, the traffic data of the highest user priority of which TID is set to '7' may be understood as the traffic of the highest transmission priority.

Referring to FIG. 4, one STA (or AP) (400) may include a virtual mapper (410), a plurality of transmission queues (420~450), and a virtual collision handler (460).

The virtual mapper (410) of FIG. 4 may perform a function of mapping an MSDU that is received from a logical link control (LLC) layer to transmission queues corresponding to each AC in accordance with Table 1, which is presented above.

The plurality of transmission queues (420~450) of FIG. 4 may perform the functions of individual EDCA contention entities for wireless media access within an STA (or AP).

For example, the transmission queue (420) of the AC_VO type of FIG. 4 may include one frame (421) for a second STA (not shown). The transmission queue (430) of the AC_VI type may include 3 frames (431~433) for a first STA (not shown) and one frame (434) for a third STA in accordance with a transmission order by which the frames are to be transmitted to a physical layer.

The transmission queue (440) of the AC_BE type of FIG. 4 may include one frame (441) for a second STA (not shown), and one frame (442) for a third STA (not shown), and one frame (443) for a second STA (not shown) in accordance with a transmission order by which the frames are to be transmitted to a physical layer.

As an example, the transmission queue (450) of the AC_BK type of FIG. 4 may not include a frame that is to be transmitted to a physical layer.

If two or more ACs each having completed the backoff procedure exist in the STA at the same time, collision between the ACs may be adjusted (or controlled) in accordance with an EDCA function (EDCAF), which is included in the virtual collision handler (460).

More specifically, the frame belonging to the AC having the highest priority level may be transmitted beforehand, and other ACs may increase the contention window values and may update the backoff count.

A transmission opportunity (TXOP) may be initiated (or started) when a channel is accessed in accordance with an EDCA rule. When two or more frames are accumulated in one AC, and if an EDCA TXOP is acquired, the AC of an EDCA MAC layer may attempt to perform multiple frame transmissions.

If the STA has already transmitted one frame, and if the STA is also capable of transmitting a next frame existing in the same AC within the remaining TXOP time and then capable of receiving its respective ACK, the STA may attempt to perform the transmission of the corresponding next frame after an SIFS time interval.

A TXOP limit value may be configured as a default value in the AP and the STA, or a frame that is related to the TXOP limit value may be transported (or delivered) to the STA from the AP. If the size of the data frame that is to be transmitted exceeds the TXOP limit value, the AP may perform fragmentation on the corresponding frame into a plurality of smaller frames. Subsequently, the fragmented frames may be transmitted within a range that does not exceed the TXOP limit value.

Figure 5:
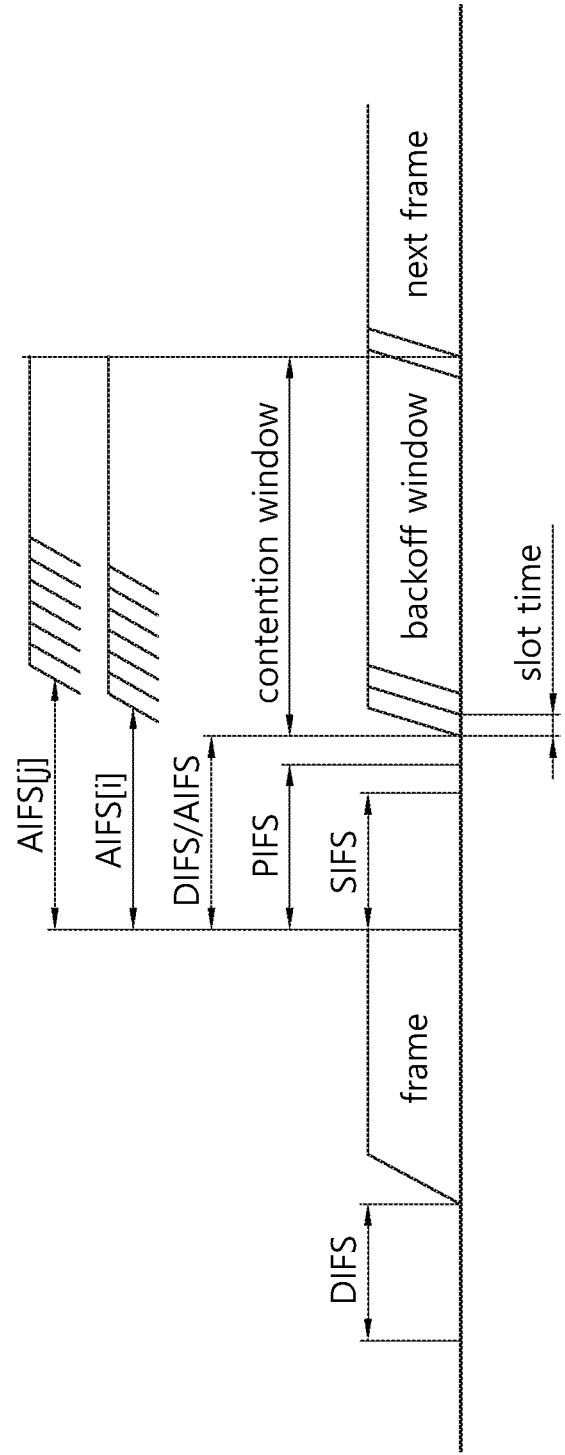
FIG. 5 is a conceptual diagram illustrating a backoff procedure of an EDCA.

FIG. 5 is a conceptual diagram illustrating a backoff procedure of an EDCA. Referring to FIG. 4 and FIG. 5, the traffic data (or traffic) transmitted from the STA may be transmitted in the contention-based EDCA scheme according to priority and the backoff procedure.

For example, the priorities respectively assigned to each traffic data may be configured as either one of eight user priority represented in Table 1 above.

As described above, one STA has four different output queues and each output queue may perform a channel access process according to the EDCA rules individually. Each output queue may transmit traffic data using different Arbitration Interframe Spaces (AIFSs) according to each priority instead of the DCF Interframe Spaces (DIFSs) previously used.

Further, in the case that the STA (or AP) needs to transmit traffics having different priorities at the same time, a traffic having a higher priority is transmitted earlier than the others, thereby preventing collision in the STA (or AP).

In order to start a backoff procedure, each STA (or AP) sets a backoff time Tb[i] to a backoff timer. The backoff time Tb[i] may be a pseudo-random integer value and computed using Equation 1 below.

$$T_b = \text{Random}(i) \times \text{SlotTime} \quad \text{[Equation 1]}$$

Here, Random(i) is a function that generates an arbitrary integer between 0 and CW[i] using a uniform distribution. CW[i] is a contention window between the minimum contention window CWmin[i] and the maximum contention window CWmax[i], and i corresponds to the user priority represented in Table 1.

In the case that the STA that performs the backoff procedure transmits a frame, when collision occurs and retransmission is needed, Equation 2 below may be used. That is, at every collision, a new contention window $CW_{new}[i]$ may be computed using the previous window $CW_{old}[i]$.

$$CW_{new}[i] = ((CW_{old}[i]+1) \times PF) - 1 \quad \text{[Equation 2]}$$

Here, PF value is computed according to the procedure defined in the IEEE 802.11e standard. CWmin[i], CWmax[i], AIFS[i], and PF value, which are EDCA parameters, may be set as default values in each STA (or AP). Otherwise, the EDCA parameters may be received from an AP through QoS parameter set element included in a management frame.

Hereinafter, in an embodiment of the present invention, a terminal may be a device that may support both of a wireless LAN system and a cellular system. That is, a terminal may be interpreted as a UE that supports a cellular system or an STA that supports a wireless LAN system.

In the case that the backoff procedure of a transmission queue 430 of AC VI type of FIG. 4 is terminated firstly based on Equation 1 and Equation 2 above, the transmission queue 430 of AC VI type may obtain a transmission opportunity (hereinafter, 'TXOP') for accessing a medium.

The AP 400 of FIG. 4 may determine the transmission queue 430 of AC VI type to be a primary AC and the remaining transmission queues 420, 440 and 450 as secondary ACs.

As such, the the transmission queue of which backoff procedure is terminated firstly by performing the backoff procedure for a plurality of transmission queues 420 to 450 based on Equation 1 and Equation 2 above may be referred to as a primary AC rule.

Based on the primary AC determined by the primary AC rule above, transmission opportunity duration according to TXOP may be determined. In addition, in the transmission opportunity duration determined based on the primary AC, the frames included in the secondary AC may also be transmitted together.

The description for SIFS, PIFS, DIFS and AIFS, which are channel access timings shown in FIG. 5 are as follows.

The short inter-frame space (SIFS) may be timing used for separating a response frame from a frame that solicits a response. For example, the duration of the SIFS may be 16 µs.

The PCF inter-frame space (PIFS) may be timing used for obtaining a priority access for a medium. The duration of the PIFS may be defined as duration in which a slot time (aSlotTime) is added to the duration of the SIFS (aSIFSTime). For example, the duration of a slot time (aSlotTime) may be 9 µs.

The DCF inter-frame space (DIFS) may be timing for transmitting a data frame and a management frame under the DCF. The duration of the DIFS may be defined as a duration in which two slot times (aSlotTime) are added to the duration of the SIFS (aSIFSTime).

The arbitration inter-frame space (AIFS) may be defined as Equation 3 below so as to have different value for each access category (AC) specified for an access priority in the EDCA procedure.

$$\text{AIFSN}[AC] = a\text{SIFSTime} + \text{AIFSN}[AC] \times a\text{SlotTime} \quad \text{[Equation 3]}$$

Referring to Equation 3 above, AIFSN[AC] may be a value differently set according to the access category (AC).

For example, in the case that the access category (AC) type of a frame to be transmitted by an STA is AC BK, AIFSN[AC] may be '7'. In the case that the access category (AC) type of a frame to be transmitted by an STA is AC BE, AIFSN[AC] may be '3'. In the case that the access category (AC) type of a frame to be transmitted by an STA is AC VI or AC VO, AIFSN[AC] may be '2'.

Figure 6:
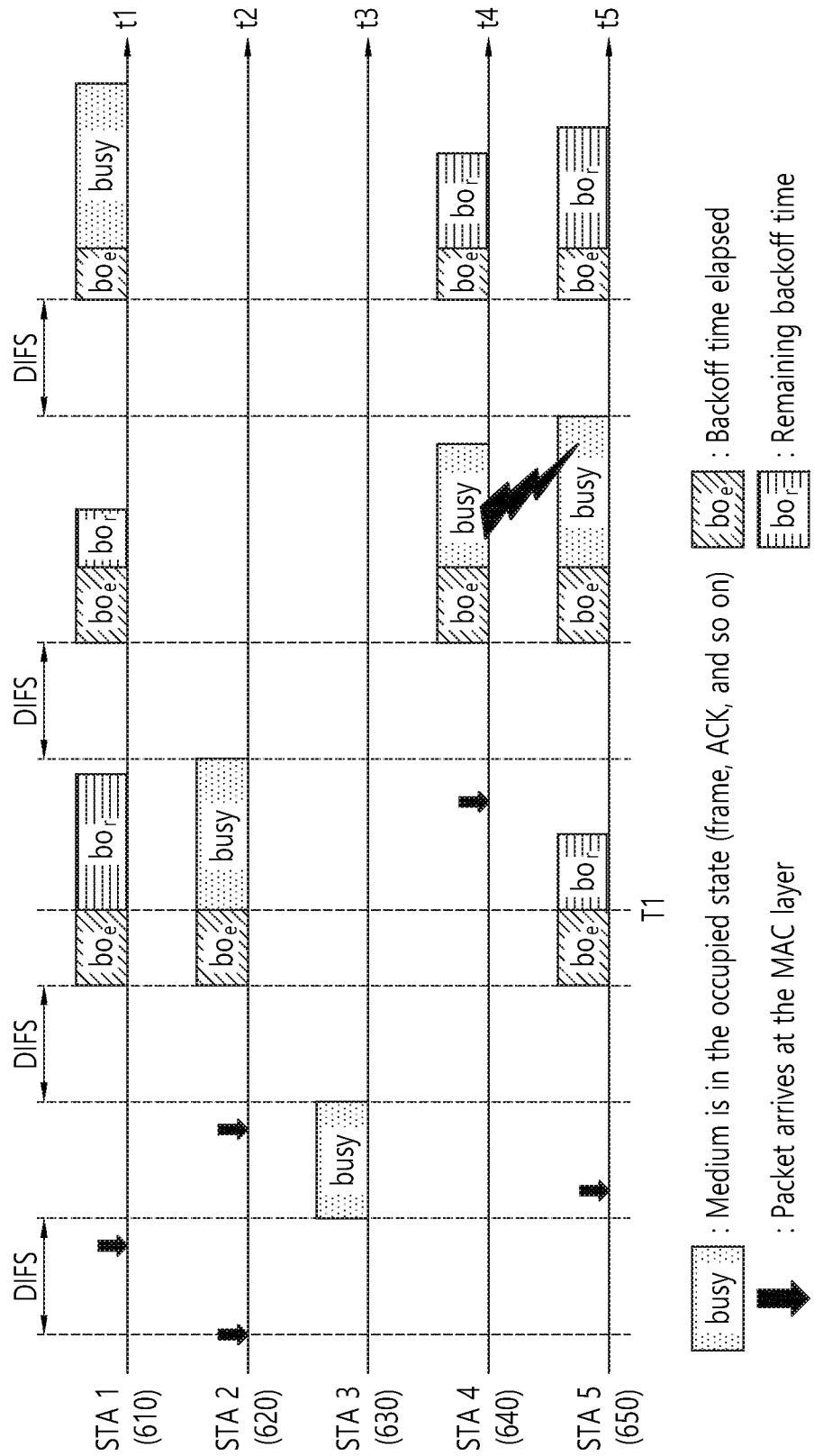
FIG. 6 is a diagram illustrating a backoff period and a frame transmission procedure in a wireless communication system.

FIG. 6 is a diagram illustrating a backoff period and a frame transmission procedure in a wireless communication system. Referring to FIG. 6, the horizontal axes (t1 to t5) for first to fifth STAs 610 to 650 may represent time axes. In addition, the vertical axes for the first to fifth STAs 610 to 650 may represent backoff times which are transmitted.

Referring to FIG. 4 to FIG. 6, when a medium switches from an occupied (or busy) state to an idle state, a plurality of STAs may attempt to transmit data (or frames).

In this case, as a scheme for minimizing a collision, each of the STAs may select a backoff time Tb[i] of Equation 1, may attempt transmission after waiting for a slot time corresponding to the selected backoff time.

When the backoff procedure starts, each STA may countdown the selected backoff count time based on a slot time unit. Each STA may monitor a medium during the countdown. When the medium is monitored as a busy state, the STA may stop the countdown and waits. When the medium is monitored as an idle state, the STA resumes the countdown.

Referring to FIG. 6, when a frame for the third STA 630 arrives at the MAC layer of the third STA 630, the STA 630 may check whether a medium is in an idle state during the DIFS. Subsequently, when it is determined to be an idle state during the DIFS, the third STA 630 may transmit the frame to an AP (not shown). However, the inter frame space (IFS) of FIG. 6 is shown as DIFS, but it is understood that the present disclosure is not limited thereto.

While a frame is transmitted from the third STA 630, the remaining STAs may monitor the occupation state of the medium and wait for the transmission duration of the frame. The frame may arrive at each of the MAC layers of the first STA 610, the second STA 620 and the fifth STA 650. When the medium is monitored as an idle state, each of the STAs may wait for a DIFS and countdown an individual backoff time selected by each of the STAs.

Referring to FIG. 6, it is shown that the second STA 620 has selected the smallest backoff time and the first STA 610 has selected the greatest backoff count value. It is shown that the remaining backoff time of the fifth STA 650 is shorter than the remaining backoff time of the first STA 610 at a point of time T1 at which the backoff procedure for the backoff time selected by the second STA 620 finishes a backoff count and starts a frame transmission.

When the medium is occupied by the second STA 620, the first STA 610 and the fifth STA 650 may suspend the backoff procedure and wait. Then, when the medium occupation of the second STA 620 is terminated (i.e., the medium is in the idle state again), the first STA 610 and the fifth STA 650 may wait for DIFS.

Subsequently, the first STA 610 and the fifth STA 650 may resume the backoff procedure based on the suspended remaining backoff time. In this case, since the remaining backoff time of the fifth STA 650 is shorter than the remaining backoff time of the first STA 610, the fifth STA 650 may complete the backoff procedure faster than the first STA 610.

Meanwhile, referring to FIG. 6, when the medium is occupied by the second STA 620, the frame for the fourth STA 640 may arrive at the MAC layer of the fourth STA 640. When the medium is in an idle state, the fourth STA 640 may wait for DIFS. Subsequently, the fourth STA 640 may countdown the backoff time selected by the fourth STA 640.

Referring to FIG. 6, the remaining backoff time of the fifth STA 650 may coincide with the backoff time of the fourth STA 640 incidentally. In this case, collision may occur between the fourth STA 640 and the fifth STA 650. When collision occurs between STAs, all of the fourth STA 640 and the fifth STA 650 may not receive ACK, and fail to transmit data.

Accordingly, the fourth STA 640 and the fifth STA 650 may compute a new contention window $CW_{new}[i]$ individually according to Equation 2 above. Subsequently, the fourth STA 640 and the fifth STA 650 may perform the countdown for the backoff time computed newly according to Equation 2 above.

Meanwhile, when the medium is in a busy state due to the transmission performed by the fourth STA 640 and the fifth STA 650, the first STA 610 may wait. Subsequently, when the medium is in the idle state, the first STA 610 may resume the backoff counting after waiting for DIFS. When the remaining backoff time of the first STA 610 is lapsed, the first STA 610 may transmit a frame.

A CSMA/CA mechanism may also include virtual carrier sensing in addition to physical carrier sensing, wherein the AP and/or STA directly senses the medium.

Virtual carrier sensing is performed to compensate problems that may occur during medium access, such as a hidden node problem, and so on. In order to perform virtual carrier sensing, a MAC of the WLAN system uses a Network Allocation Vector (NAV). The NAV corresponds to a value that is indicated by an AP and/or an STA that is currently using the medium or that has the authority to use the medium to another AP and/or STA, wherein the value indicates the time remaining until the medium returns to its state of being available for usage. Accordingly, a value that is set as the NAV corresponds to a time period during which the usage of the medium is scheduled by the AP and/or STA, which transmits the corresponding frame, and the STA receiving the NAV value is prohibited from accessing the medium during the corresponding time period. For example, the NAV may be configured in accordance with a value of the duration field of the MAC header of the corresponding frame.

Figure 7:
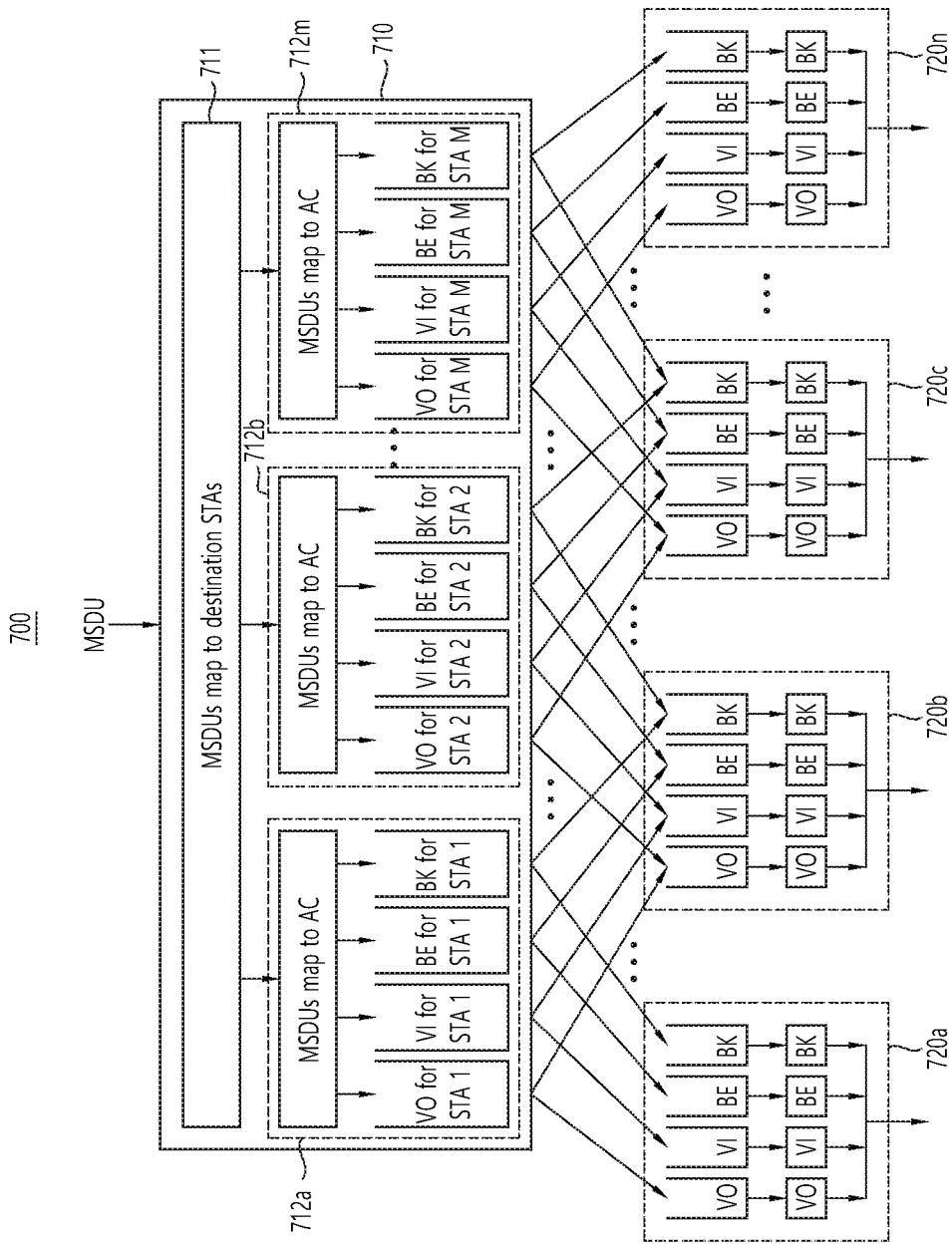
FIG. 7 is a diagram illustrating concept of an STA that performs a channel access based on extended EDCA in a wireless LAN system according to the present embodiment.

FIG. 7 is a diagram illustrating concept of an STA that performs a channel access based on extended EDCA in a wireless LAN system according to the present embodiment.

An STA 700 that performs extended EDCA according to the present embodiment may include a DMG antenna mapper 710 and a plurality of antenna modules 720a to 720n (n is a natural number).

The DMG antenna mapper 710 may map the traffic data (e.g., MSDU) from reached to the MAC layer of the STA 700 from the LLC layer of the STA 700 to Directional Multi-Gigabit (DMG) antenna for each STA.

Particularly, the DMG antenna mapper 710 may include a virtual mapper 711 and a plurality of transport blocks 712a to 712m (m is a natural number). For a brief description, it may be understood that the first transport block 712a is an element for the traffic to be transmitted to a first user. It may be understood that the second transport block 712b is an element for the traffic to be transmitted to a second user. It may be understood that the $M^{th}$ transport block 712m is an element for the traffic to be transmitted to an $M^{th}$ user (e.g., M is a natural number).

The virtual mapper 711 may map the traffic data to the transport block based on user information (e.g., information included in Receiver Address field) of received traffic data.

For example, the virtual mapper 711 may forward the traffic data (e.g., MSDU) for the first user to the first transport block 712a. The virtual mapper 711 may forward the traffic data (e.g., MSDU) for the second user to the second transport block 712b. The virtual mapper 711 may forward the traffic data (e.g., MSDU) for the $M^{th}$ user to the $M^{th}$ transport block 712m.

The plurality of transport blocks 712a to 712m may classify the traffic data (e.g., MSDU) internally according to QoS information of the traffic data (e.g., MSDU) received from the virtual mapper 711.

That is, the plurality of transport blocks 712a to 712m may forward the traffic data (e.g., MSDU) to the transmission queue of an access category type corresponding to the QoS information of the received traffic data (e.g., MSDU) among a plurality of access categories VO, VI, BE and BK.

For a brief description, it may be understood that the first antenna module 720a is an element for a first DMG antenna associated with the first user and the second antenna module 720b is an element for a second DMG antenna associated with the second user. In addition, it may be understood that the third antenna module 720c is an element for a third DMG antenna for a third STA and the $N^{th}$ antenna module 720n is an element for a $N^{th}$ DMG antenna for an $N^{th}$ STA (e.g., N is a natural number).

In addition, the DMG antenna mentioned in the present disclosure may include a plurality of physical antennas (not shown). In the present disclosure, it is understood that the DMG antenna is a set of a plurality of physical antennas arranged in a direction logically.

A plurality of antenna modules 720a to 720n may be the elements for a plurality of DMG antennas which are arranged in individual directions for a plurality of users. The plurality of antenna modules 720a to 720n may be connected with the plurality of transport blocks 712a to 712m.

The first antenna module 720a may receive data (e.g., MSDU) transmitted from the first transport block 712a. The second antenna module 720b may receive data transmitted from the second transport block 712b.

The third antenna module 720c may receive data transmitted from the third transport block (not shown). The $N^{th}$ antenna module 720n may receive data transmitted from the $n^{th}$ transport block (not shown).

The STA 700 that includes the plurality of antenna modules 720a to 720n according to the present embodiment may cover a plurality of directions.

The STA 700 that includes the plurality of antenna modules 720a to 720n may perform EDCA process for a plurality of directions individually. In the present embodiment, the EDCA process performed in a plurality of antenna modules for a plurality of directions may be referred to an extended EDCA process.

Each of the antenna modules 720a to 720n may include four transmission queues corresponding to four access categories AC VO, AC VI, AC BE and AC BK. Each of the antenna modules 720a to 720n may regard the four access categories as individual EDCA entities.

That is, the access category of which an internal backoff is completed firstly through an individual backoff procedure for each of the antenna modules 720a to 720n may be determined to be a primary AC.

The individual EDCA process performed in a plurality antenna modules mentioned in the present disclosure may be referred to as an internal backoff procedure of each antenna module. The individual EDCA process (i.e., an internal backoff procedure performed in each antenna module) may be understood based on the contents described using FIG. 4 and FIG. 5 above.

The STA that includes the plurality of antenna modules 720a to 720n according to the present embodiment may perform CCA processes for a plurality of directions simultaneously. The CCA processes performed for a plurality of directions simultaneously may be referred to as a directional CCA process in the present disclosure.

The existing STA may determine a channel state by comparing the power level of the signal received from a physical layer with a preconfigured threshold value based on the CCA process. For example, in the case that a power level of the received signal is smaller than the threshold value, the channel state is determined to be an idle state. On the contrary, in the case that a power level of the received signal is greater than the threshold value, the channel state is determined to be a busy state.

In the directional CCA process, in the case that the CCA process of any one direction among a plurality of directions is determined to be busy, the backoff timer for the corresponding direction may be deferred. On the contrary, in the case that the CCA process of any one direction among a plurality of directions is determined to be idle, the backoff timer for the corresponding direction may be progressed (i.e., countdown).

The DMG antenna mentioned in the present disclosure may be understood as the concept including a channel of each specific direction. For example, as a result of performing the directional CCA process, in the case that the channel state for a first direction for a first user is determined to be busy, it may be understood that the first DMG antenna associated with the first direction is busy.

As another example, as a result of performing the directional CCA process, in the case that the channel state for a second direction for a second user is determined to be idle, it may be understood that the second DMG antenna associated with the second direction is idle.

Figure 8:
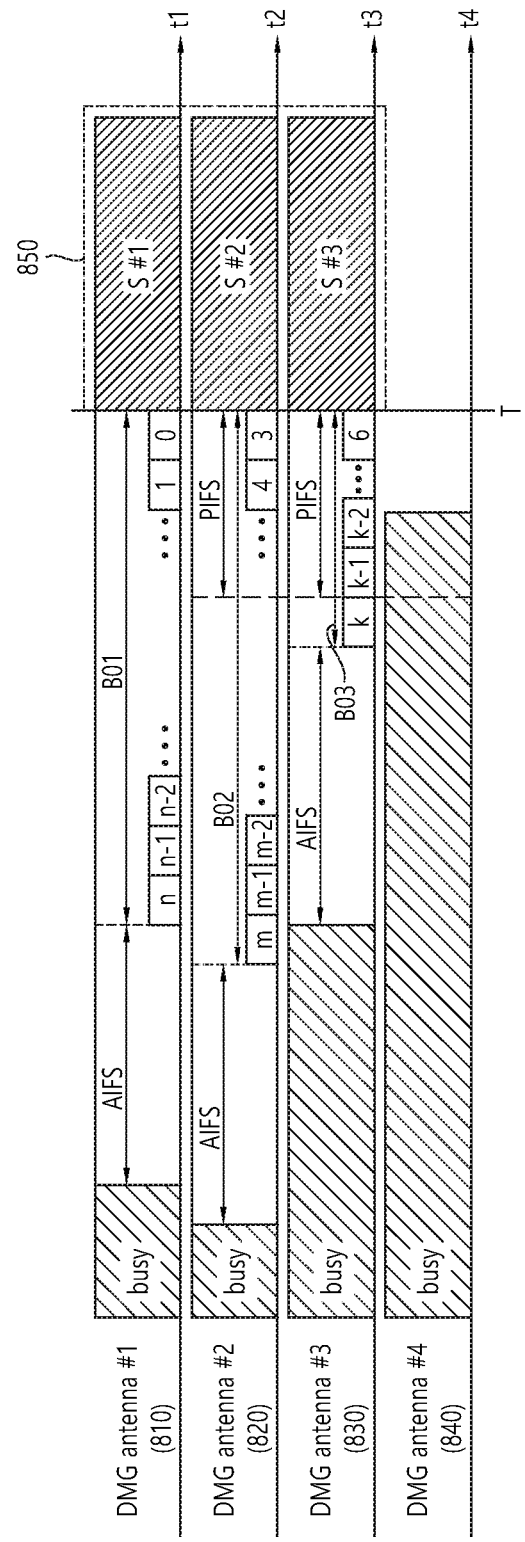
FIG. 8 is a diagram illustrating a method for performing a transmission using a plurality of antennas based on directional CCA process and extended EDCA process according to the present embodiment.

FIG. 8 is a diagram illustrating a method for performing a transmission using a plurality of antennas based on directional CCA process and extended EDCA process according to the present embodiment.

Referring to FIG. 1 to FIG. 8, an STA (e.g., 700 in FIG. 7) may include first to fourth DMG antennas 810 to 840. The horizontal axes of the first to fourth DMG antennas 810 to 840 represent times t1 to t4, and the vertical axes thereof may be associated with channel states and a progress of countdown procedure.

The STA (e.g., 700 in FIG. 7) according to the present embodiment may perform the directional CCA process for the first to fourth DMG antennas 810 to 840 individually.

As a result of the directional CCA process, the countdown procedure for a DMG antenna determined to be idle among the first to fourth DMG antennas 810 to 840 may be progressed during a check time.

As a result of the directional CCA process, the countdown procedure for a DMG antenna determined not to be idle among the first to fourth DMG antennas 810 to 840 may not be progressed during a check time.

In the present disclosure, the check time may be understood as AIFS set for each DMG module. The primary AC of an antenna module mentioned in the present disclosure may mean the transmission queue in which the internal backoff procedure performed in the antenna module is completed firstly. Accordingly, different time length values may be set as the check time (i.e., AIFS) according to the primary AC of an antenna module corresponding to each DMG antenna.

Referring to FIG. 8, the countdown procedure for the first to third DMG antennas 810, 820 and 830 may be initiated according to a result of the directional CCA process. The countdown procedure for the fourth DMG antenna 840 may not be initiated according to a result of the directional CCA process.

It may be understood that the first countdown procedure BO1 for the first DMG antenna 810, the second countdown procedure BO2 for the second DMG antenna 820 and the third countdown procedure BO3 for the third DMG antenna 830 are EDCA processes performed by the first to third antenna modules 720a to 720c individually.

The DMG antenna module corresponding to each DMG antenna may perform the countdown procedure. In addition, the initial value set by the backoff counter for each DMG antenna may be determined the QoS information of the traffic data received in the DMG antenna module corresponding to each DMG antenna and Equation 1 above.

For example, the initial value (e.g., n, n is a natural number) of the first countdown procedure BO1 for the first DMG antenna 810 may be set. That is, the first antenna module 720a corresponding to the first DMG antenna 810 may perform the first countdown procedure BO1 that decreases a counter value based on the first backoff counter to which the initial value (n, for FIG. 8) is set.

For example, the initial value (e.g., m, m is a natural number) of the second countdown procedure BO2 for the second DMG antenna 820 may be set. That is, the second antenna module 720b corresponding to the second DMG antenna 820 may perform the second countdown procedure BO2 that decreases a counter value based on the second backoff counter to which the initial value (m, for FIG. 8) is set.

For example, the initial value (e.g., k, k is a natural number) of the third countdown procedure BO3 for the third DMG antenna 830 may be set. That is, the third antenna module 720c corresponding to the third DMG antenna 830 may perform the third countdown procedure BO3 that decreases a counter value based on the third backoff counter to which the initial value (k, for FIG. 8) is set.

Referring to FIG. 8, the first backoff counter for the first countdown procedure BO1 may expire on a specific time T. In the present disclosure, it may be mentioned that the first countdown procedure BO1 is completed when the first backoff counter expires (i.e., becomes '0').

In the specific time T, the second backoff counter for the second countdown procedure BO2 and the third backoff counter for the third countdown procedure BO3 may not expire.

In the present disclosure, since the second backoff counter and the third backoff counter is not '0', it may be mentioned that the second countdown procedure BO2 and the third countdown procedure BO3 may not expire.

In the present embodiment, the DMG antenna in which the countdown procedure is completed firstly (i.e., the backoff timer expires firstly) is referred to as a primary antenna. In the case of FIG. 8, the first DMG antenna 810 may be the primary antenna.

In the present embodiment, the DMG antenna that fails to complete the countdown procedure is referred to as a secondary antenna through an additional determination procedure. In the present disclosure, when a transmission is performed based on the primary antenna, the secondary antenna means an antenna that may be used together with the primary antenna.

As an example of FIG. 8, the STA according to the present embodiment may identify whether the DMG antenna that fails to complete the direction countdown procedure until a completion time T from a threshold time is idle based on the completion time T according to the CCA process.

The DMG antenna identified to be idle until the completion time T from the threshold time based on the completion time T may be determined to be the secondary antenna.

Referring to FIG. 8, the threshold time used in the procedure of determining the secondary antenna may be PIFS. However, the present disclosure is not limited thereto, but the threshold time used in the procedure of determining the secondary antenna may also be AIFS.

In the case of FIG. 8, the STA may identify whether the second DMG antenna 820 that fails to complete the second direction countdown procedure BO2 until the completion time T from PIFS is idle based on the completion time T according to the CCA process.

As an example, according to the CCA process, in the case that the second DMG antenna 820 is identified to be idle from PIFS to the completion time T based on the completion time T, the second DMG antenna 820 may be determined to be the secondary antenna.

In addition, the STA may identify whether the third DMG antenna 830 that fails to complete the third direction countdown procedure BO3 until the completion time T from PIFS is idle based on the completion time T according to the CCA process.

As an example, according to the CCA process, in the case that the third DMG antenna 830 is identified to be idle from PIFS to the completion time T based on the completion time T, the third DMG antenna 830 may be determined to be the secondary antenna.

The STA according to the present embodiment may transmit a plurality of streams 850 based on the primary antenna 810 and the secondary antenna 820.

Particularly, a first stream S #1 may be transmitted to a first user (not shown) based on the first DMG antenna 810. A second stream S #2 may be transmitted to a second user (not shown) based on the second DMG antenna 820. A third stream S #3 may be transmitted to a third user (not shown) based on the third DMG antenna 830.

In FIG. 8, instead of stopping the backoff counters of other DMG antennas which are idle except the primary antenna, the STA may change the backoff counters of other DMG antennas to '0' immediately, and then, perform a transmission together with the primary antenna.

In FIG. 8, after the STA may wait until the backoff counters of other DMG antennas are changed to '0' except the primary antenna, the STA may perform a transmission together with the primary antenna.

As an example, the number of DMG antennas waited until the backoff counters thereof are changed to '0' may correspond to a preconfigured value for MIMO transmission for multi-users.

As an example, the number of DMG antennas waited until the backoff counters thereof are changed to '0' may correspond to the number of antennas of which backoff counters becomes '0' during a preconfigured time duration. As an example, the STA may wait until the backoff counters of all DMG antennas becomes '0'.

In the case of FIG. 8, the first stream S #1 corresponding to the primary antenna 810 may include a packet included in the transmission queue (i.e., primary AC) in which an internal backoff procedure is completed firstly in the first antenna module 720a.

In addition, the second stream S #2 corresponding to the secondary antenna 820 may be selected by comparing an amount of a packet included in the primary AC of the first DMG antenna 810 and an amount of a packet included in a plurality of transmission queues of the second antenna module 720b.

As an example, the STA according to the present embodiment may compare an amount of a packet included in the primary AC of the first DMG antenna 810 with an amount of a packet included in a plurality of transmission queues of the second antenna module 720b individually.

As a result of the comparison, in the case that the amount of a packet included in the primary AC of the first DMG antenna 810 is nearest to the amount of a packet included in a transmission queue of AC BE type of the second antenna module 720b, the packet included in a transmission queue of AC BE type of the second antenna module 720b may be selected as the second stream S #2.

As another example, the STA according to the present embodiment may select the packet included in the AC that has the smallest backoff value in an internal backoff procedure of the second antenna module 720b on the time T of determining the first DMG antenna 810 to be the primary antenna.

In the case that the AC of VI type has the smallest backoff value in an internal backoff procedure of the second antenna module 720b, the packet included in AC VI type may be selected as the second stream S #2.

It is understood that the selection procedure of the third stream S #3 corresponding to the secondary antenna may be selected in the same procedure as the selection procedure of the second stream described above. The internal backoff procedure described above may be understood based on FIG. 4 and FIG. 5 above.

As another example, the STA according to the present embodiment may select the packet of the same type as the primary AC of the primary antenna 810 as the second stream S #2 and/or the third stream S #3.

In the present embodiment, it is described that a plurality of streams is transmitted to a plurality of users using a plurality of DMG antennas, but it is understood that the present disclosure is not limited thereto. That is, it is understood that the present disclosure may also include an example that a plurality of streams is transmitted to a single user using a plurality of DMG antennas.

Although it is not shown in FIG. 8, in the case that the countdown procedure for at least two or more DMG antennas is completed simultaneously (backoff counters are changed to '0' simultaneously), the STA may perform a transmission using at least two or more DMG antennas in which the countdown procedure is completed simultaneously.

Figure 9:
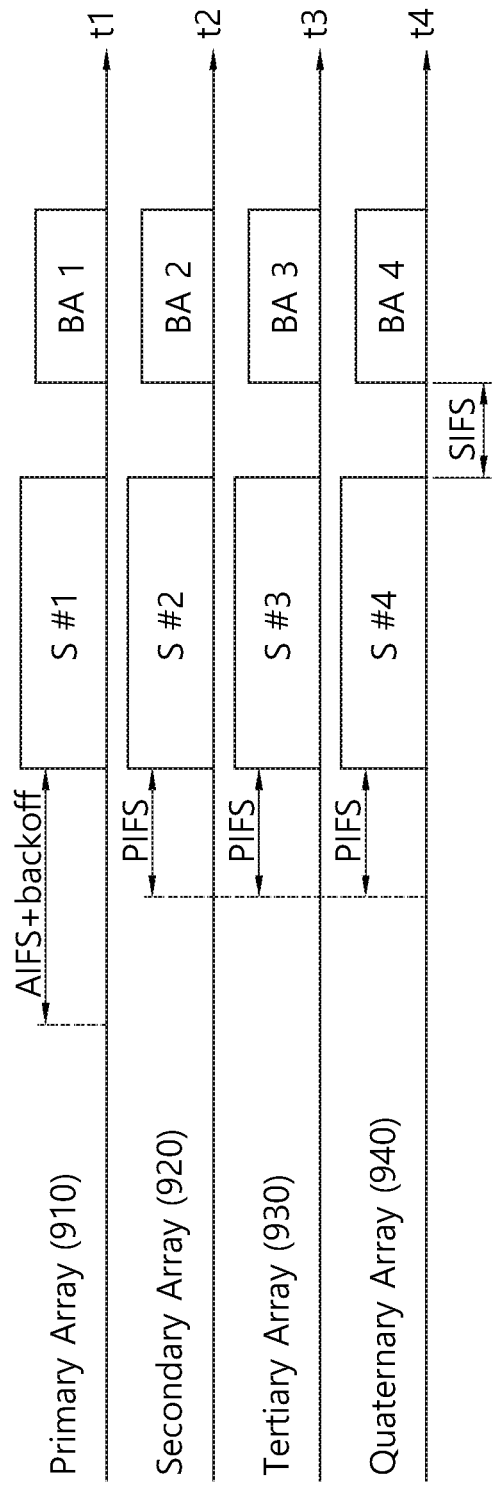
FIG. 9 is a diagram embodying a method for multi-user transmission based on directional CCA process and extended EDCA process according to the present embodiment.

FIG. 9 is a diagram embodying a method for multi-user transmission based on directional CCA process and extended EDCA process according to the present embodiment.

Referring to FIG. 1 to FIG. 9, a primary array 910 may correspond to the first DMG antenna 810 of FIG. 8, and a secondary array 920 may correspond to the second DMG antenna 820 of FIG. 8.

A tertiary array 930 may correspond to the third DMG antenna 830 of FIG. 8, and a quaternary array 940 may correspond to the fourth DMG antenna 840 of FIG. 8.

As described above, in the aspect that the DMG antennas are a set of physical antennas having the same direction logically, in the present disclosure, the concept of the DMG antenna and the array may be understood in the same line.

In the embodiment of FIG. 9, through the directional CCA process and the extended EDCA process, a plurality of streams S #1 to S #4 may be transmitted base on all of the arrays 910, 920, 930 and 940.

Subsequently, in response to the plurality of streams S #1 to S #4, the STA according to the present embodiment may receive a plurality of reception frames BA1 to BA4 after a predetermined time. In an example of FIG. 8, the predetermined time may be short inter-frame space (SIFS).

In the case that the plurality of streams S #1 to S #4 is transmitted for a single user (SU), the plurality of reception frames BA1 to BA4 may be a frame which is received from the single user.

In the case that the plurality of streams S #1 to S #4 is transmitted for multi-user (MU), the plurality of reception frames BA1 to BA4 may be a frame which is individually received from the multi-user.

Figure 10:
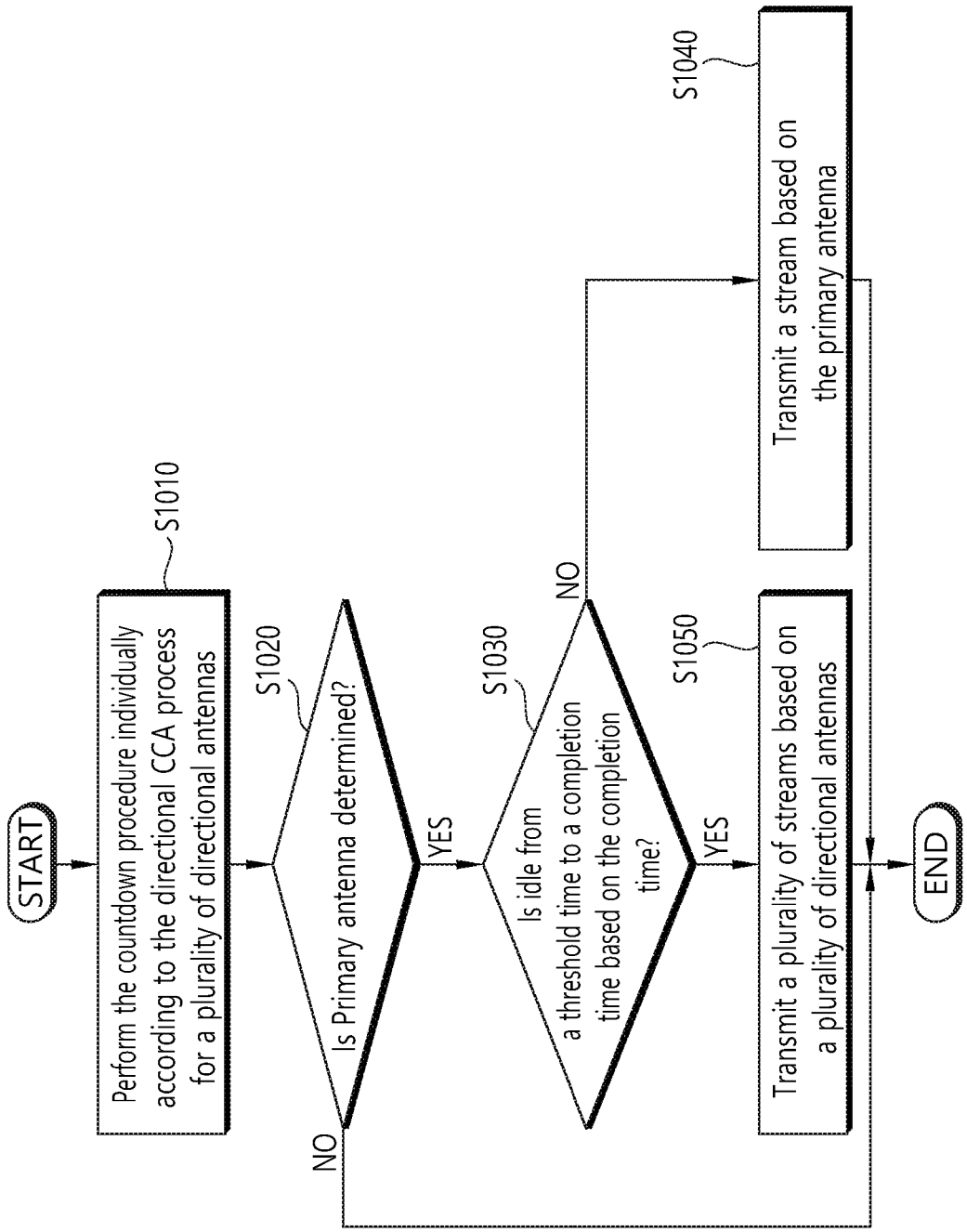
FIG. 10 is a flowchart illustrating a method for performing a transmission using a plurality of antennas based on directional CCA process and extended EDCA process.

FIG. 10 is a flowchart illustrating a method for performing a transmission using a plurality of antennas based on directional CCA process and extended EDCA process.

Referring to FIG. 1 to FIG. 10, in step S1010, the STA according to the present embodiment may perform the countdown procedure individually according to the directional CCA process for a plurality of directional antennas. It may be understood that the plurality of directional antennas mentioned in FIG. 10 is the first to fourth DMG antennas 810 to 840 mentioned in FIG. 8.

For example, the directional CCA process may be a process of determining a specific directional antenna to be idle when a reception level of a signal received in a physical antenna of the specific directional antenna is smaller than a preconfigured threshold value.

In addition, the directional CCA process may be a process of determining a specific directional antenna to be busy when a reception level of a signal received in a physical antenna of the specific directional antenna is greater than a preconfigured threshold value.

For example, when it is determined that a specific directional antenna is idle during a preconfigured check time, the individual countdown procedure associated with the specific directional antenna may be performed.

In this case, based on an initial value of the backoff counter set based on each primary AC of a plurality of directional antennas, the individual countdown procedure may be performed.

In addition, when it is determined that a specific directional antenna is not idle during a preconfigured check time, the individual countdown procedure associated with the specific directional antenna may not be performed.

As an example, the check time may be Arbitration Inter-Frame Space computed through Equation 3 above.

In step S1020, the STA may determine whether to determine the primary antenna. The STA according to the present embodiment may determine the directional antenna corresponding to the countdown procedure firstly completed among a plurality of countdown procedures corresponding to a plurality of directional antennas to be the primary antenna.

In the case that the primary antenna is not determined, the procedure is terminated. In the case that the primary antenna is not determined, step S1030 may be performed.

In step S1030, the STA according to the present embodiment may determine whether other directional antennas is idle from a threshold time to a completion time based on the completion time of the countdown procedure corresponding to the primary antenna. As an example, it is understood that the threshold time is PCF inter-frame space (PIFS).

In the case that other directional antennas is not idle from a threshold time to a completion time based on the completion time of the countdown procedure corresponding to the primary antenna, step S1040 may be performed.

In step S1040, the STA according to the present embodiment may transmit a stream using the primary antenna.

In the case that other directional antennas is idle from a threshold time to a completion time based on the completion time of the countdown procedure corresponding to the primary antenna, step S1050 may be performed.

In step S1050, the STA according to the present embodiment may transmit a plurality of streams based on the primary antenna and the secondary antenna.

According to FIG. 7 to FIG. 10, based on the directional CCA process and the extended EDCA process performed for a plurality of directions, SU-MIMO and MU-MIMO may be efficiently supported, and simultaneously, a wireless LAN system of which throughput is improved may be provided.

Figure 11:
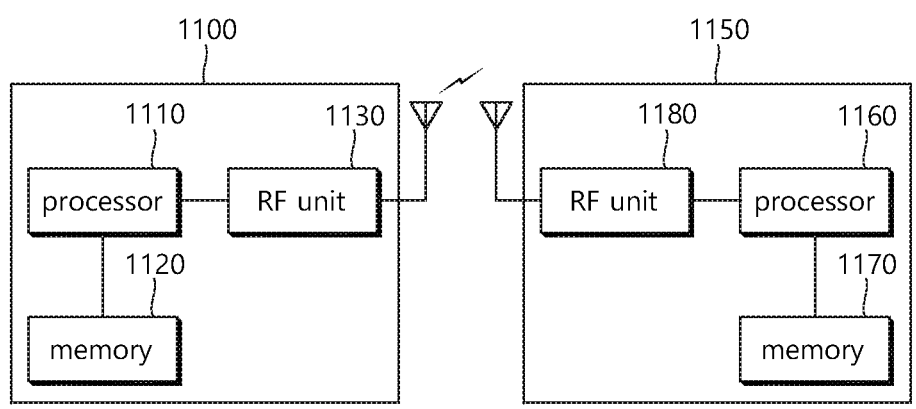
FIG. 11 is a block diagram illustrating a wireless terminal to which the present embodiment may be applied.

FIG. 11 is a block diagram illustrating a wireless terminal to which the present embodiment may be applied.

Referring to FIG. 11, a wireless terminal is an STA that may implement the embodiment described above, and may be an AP or a non-AP station (STA). The wireless terminal may correspond to the user described above, or may correspond to a transmission terminal that transmit a signal to the user.

The AP 1110 includes a processor 1110, a memory 1120 and a radio frequency (RF) unit 1130.

The RF unit 1130 may be connected with the processor 1110, and transmit/receive a radio signal.

The processor 1110 may implement the proposed functions, processes and/or methods of the present disclosure. For example, the processor 1110 may perform the process described above. The processor 1110 may perform the process of the AP described in the embodiments of FIG. 1 to FIG. 10.

The non-AP STA 1150 includes a processor 1160, a memory 1170 and a radio frequency (RF) unit 1180.

The RF unit 1180 may be connected with the processor 1160, and transmit/receive a radio signal.

The processor 1160 may implement the proposed functions, processes and/or methods of the present disclosure. For example, the processor 1160 may be configured to perform the non-AP STA process according to the embodiment described above. The processor 1160 may perform the process of the non-AP STA described in the embodiments of FIG. 1 to FIG. 10.

The processor 1110 and 1160 may include Application-Specific Integrated Circuits (ASICs), other chipsets, logic circuits, data processors and/or convertors that reciprocally convert baseband signals and radio signals. The memory 1120 and 1170 may include Read-Only Memory (ROM), Random Access Memory (RAM), flash memory, memory cards, storage media and/or other storage devices. The RF unit 1130 and 1180 may include one or more antennas to transmit and/or receive the radio signal.

When the embodiment is implemented in software, the aforementioned scheme may be implemented as a module (process or function) that performs the aforementioned function. The module may be stored in the memory 1120 and 1170, and may be executed by the processor 1110 and 1160. The memory 1120 and 1170 may be placed inside or outside the processor 1110 and 1160 and may be connected to the processor 1110 and 1160 using a variety of well-known means.

The detailed description of the present disclosure describes the detailed embodiment, but may be modified in various manners within the limit of not departing from the scope of the present disclosure. Accordingly, the scope of the present disclosure should not be determined with being limited to the embodiment described above, but determined by the equivalence to the claims of the present invention as well as the claims described below.

What is claimed is:

1. A method in a wireless local area network (WLAN) system, the method comprising:
    determining, by a station (STA) comprising a first directional antenna (ANT) and a second directional ANT, a first backoff (BO) counter value related to the first directional ANT and a second BO counter value related to the second directional ANT;
    after determining the first directional ANT as being idle, performing, by the STA, countdown of the first BO counter value;
    after determining the second directional ANT as being idle, performing, by the STA, countdown of the second BO counter value;
    determining, by the STA, the first directional ANT to be a primary ANT after the first BO counter value becomes equal to a specific value;
    determining, by the STA, whether the second directional ANT is idle during a predetermined interval preceding a time of the first BO counter value becoming equal to the specific value; and
    transmitting, by the STA, based on the second directional ANT being idle, a first stream to a first user based on the first directional ANT and a second stream to a second user based on the second directional ANT.

2. The method of claim 1, further comprising:
    determining, by the STA, the first directional ANT is idle when a first reception level of a first signal received by the first directional ANT is smaller than a first preset threshold value, and determining, by the STA, the first directional ANT is busy when the first reception level is greater than the first preset threshold value; and
    determining, by the STA, the second directional ANT is idle when a second reception level of a second signal received by the second directional ANT is smaller than a second preset threshold value, and determining, by the STA, the second directional ANT is busy when the second reception level is greater than the second preset threshold value.

3. The method of claim 1, wherein the countdown of the first BO counter value is performed after the first directional ANT is determined to be idle during a preconfigured check time based on a directional Clear Channel Assessment (CCA) process, and
    wherein the countdown of the second BO counter value is performed after the second directional ANT is determined to be idle during the check time based on the directional CCA process.

4. The method of claim 3, wherein the check time is related to Arbitration Inter-Frame Space (AIFS), and the predetermined interval is related to Point Coordination Function inter-frame space (PIFS).

5. A wireless terminal using a method in a wireless local area network (WLAN) system, the wireless terminal comprising:
    a first directional antenna (ANT);
    a second directional ANT;
    a transceiver configured to transmit and receive a radio signal; and
    a processor connected to the transceiver,
    wherein the processor is configured to:
    determine a first backoff (BO) counter value related to the first directional ANT and a second BO counter value related to the second directional ANT;
    after determining the first directional ANT as being idle, perform countdown of the first BO counter value;

after determining the second directional ANT as being idle, perform countdown of the second BO counter value;

determine the first directional ANT to be a primary ANT after the first BO counter value becomes equal to a specific value;

determine whether the second directional ANT is idle during a predetermined interval preceding a time of the first BO counter value becoming equal to the specific value; and control the transceiver to transmit, based on the second directional ANT being idle, a first stream to a first user based on the first directional ANT and a second stream to a second user based on the second directional ANT.

6. The wireless terminal of claim 5, wherein the countdown of the first BO counter value is performed after the first directional ANT is determined to be idle during a preconfigured check time based on a directional Clear Channel Assessment (CCA) process, and wherein the countdown of the second BO counter value is performed after the second directional ANT is determined to be idle during the check time based on the directional CCA process.

7. The method of claim 1, wherein the specific value is set to {0}.

8. The method of claim 1, further comprising:

transmitting, by the STA, based on the second directional ANT being busy, only the first stream to the first user.

9. The method of claim 1, further comprising:

determining, by the STA, based on a plurality of first transmission queues related to the first ANT, the first stream; and determining, by the STA, based on a plurality of second transmission queues related to the second ANT, the second stream.

10. The method of claim 9, wherein the second stream is a set of data selected by the STA based on an amount of a second packet included in one of the plurality of second transmission queues, and wherein the amount of the second packet is nearest to an amount of a first packet included in one of the plurality of first transmission queues.

* * * * *